United States Patent [19]
Poehlman

[11] Patent Number: 5,472,045
[45] Date of Patent: Dec. 5, 1995

[54] DONUT OIL COOLER WITH A REUSABLE FILTER

[75] Inventor: Robert F. Poehlman, Eindhoven, Netherlands

[73] Assignee: Modine Manufacturing Company, Racine, Wis.

[21] Appl. No.: 282,614

[22] Filed: Jul. 29, 1994

[51] Int. Cl.⁶ .................................................. F28F 19/01
[52] U.S. Cl. ........................... 165/119; 165/167; 165/916; 123/196 A; 184/6.24; 210/181; 210/184
[58] Field of Search .................................. 165/167, 119, 165/916; 123/196 A, 196 AB; 184/6.24, 104.3; 210/181, 184

[56] References Cited

U.S. PATENT DOCUMENTS

| | | | |
|---|---|---|---|
| 1,569,795 | 1/1926 | Wall | 123/196 A |
| 1,594,334 | 7/1926 | Sweetland | 184/6.24 |
| 1,951,809 | 3/1934 | Renfrew | 210/184 X |
| 2,304,618 | 12/1942 | Williams | 184/6.24 X |
| 2,306,823 | 12/1942 | Meldrum | 123/196 A |
| 2,602,548 | 7/1952 | Griffiths | 210/460 X |
| 4,561,494 | 12/1985 | Frost | 165/76 |
| 4,669,532 | 6/1987 | Tejima et al. | 165/119 X |
| 5,165,468 | 11/1992 | Tejima et al. | 165/916 X |
| 5,236,043 | 8/1993 | Armbruster et al. | 165/916 X |

FOREIGN PATENT DOCUMENTS

| | | | |
|---|---|---|---|
| 2034203 | 6/1971 | Germany | 123/196 AB |
| 73089 | 4/1987 | Japan | 165/916 |
| 353392 | 12/1992 | Japan | 165/916 |

OTHER PUBLICATIONS

Diesel Progress, Aug. 1993, pp. 38 and 39, Aug. 1983.

*Primary Examiner*—Martin P. Schwadron
*Assistant Examiner*—L. R. Leo
*Attorney, Agent, or Firm*—Wood, Phillips, VanSanten, Clark & Mortimer

[57] ABSTRACT

A filter device is provided for use with the heat exchanger utilizing a filter having a low volume mass of filter media wherein residual oil remaining in the filter is eliminated as a major environmental concern. The heat exchanger has first and second discrete flowpaths for fluid to be filtered. One of the flowpaths is designed to be in heat exchange relation with a coolant. Means are provided to establish fluid communication between the first and second discrete flowpaths with a low volume filter being situated between the establishing means and the heat exchanger, and clamp means are provided to maintain the establishing means and the low volume filter in sealed, assembled relation with the heat exchanger with the clamp means including means for providing access to an axial passageway through the clamp means.

24 Claims, 3 Drawing Sheets

DONUT OIL COOLER WITH A REUSABLE FILTER

FIELD OF THE INVENTION

This invention relates to filter devices and, more particularly, to cooler devices for use with heat exchangers.

BACKGROUND OF THE INVENTION

Due to environmental concerns, there is a pressing need to eliminate the use of disposable spin-on filters of the type typically utilized in vehicular applications. The environmental issue arises with respect to the residual oil left in these filters when they are replaced. The volume of residual oil left in a conventional spin-on filter used with a vehicle engine may be as much as a quart. Since these filters currently are disposed of in landfills, the amount of residual oil in any one landfill can be significant enough to cause serious environmental concerns. For example, presently it is estimated that each year in Minnesota alone about 250,000 gallons of oil goes to the landfills as a result of the disposal of oil filters. It is anticipated that the European Community will ban spin-on filters in the near future. Hence, there exists a need to develop alternative oil filtration systems that eliminates the environmental concern raised by the residual oil left in spin-on type filters.

Energy and vehicle weight concerns have also resulted in the increased usage of engines of reduced displacement operating at increased revolutions per minute. In such engines, more heat is rejected to the lubricating oil than in larger, slower running engines, and this has increased the usage of oil coolers with such engines.

One particularly desirable type of oil cooler is a so-called "donut" oil cooler. Donut oil coolers are compact and may be readily installed at the location on the engine whereat a conventional spin-on filter would be located. The spin-on filter is then mounted directly on the donut oil filter.

Needless to say, however, such an arrangement perpetuates the environmental degradation that has accompanied the use of spin-on filters. Thus, there is a real need for an oil cooling and filtering system that retains the many advantages associated with the use of donut oil coolers and yet overcomes the environmental problems that come with the use of spin-on filters.

SUMMARY OF THE INVENTION

Accordingly, one object of the invention is to provide a new and improved filter device for use with a heat exchanger and more specifically, to provide a new and improved filter device for use with the heat exchanger utilizing a filter having a low volume mass of filter media wherein residual oil remaining in the filter is eliminated as a major environmental concern.

An exemplary embodiment of the invention achieves the foregoing objects in a construction utilizing a filter device and a heat exchanger wherein the heat exchanger has first and second discrete flowpaths for fluid to be filtered. One of the flowpaths is designed to be in heat exchange relation with a coolant. Means are provided to establish fluid communication between the first and second discrete flowpaths with a low volume filter being situated between the establishing means and the heat exchanger, and clamp means are provided to maintain the establishing means and the low volume filter in sealed, assembled relation with the heat exchanger with the clamp means including means for providing access to an axial passageway through the clamp means.

In a preferred embodiment of the invention, the filter is a thin disc of filter media having sufficient structural integrity as to be reusable. Preferably, the thin disc has a central opening such that the thin disc has an inner peripheral edge about the opening and an outer peripheral edge about the outer circumference of the disc with circular concentric gaskets mounted to the disc edges so that the clamp means seals the establishing means against at least the one gasket on the outer peripheral edge of the thin disc. For some applications, multiple thin filter discs can be utilized. Most advantageously, when multiple filter discs are used, one of the discs is made from a fibrous material.

In another preferred embodiment, the filter media is a thin screen element of fine mesh. Preferably, the fluid flows through tile first discrete flowpaths, the fine mesh and then the second fluid flowpath in series so that contaminates in the fluid are trapped by the screen element before the fluid enters the second discrete flowpath. The second discrete flowpath preferably is defined by an elongate opening in the oil cooler and receiving the clamp means therethrough, with the establishing means including means for directing the fluid toward the second discrete flowpath. The invention further contemplates that the access providing means is an opening in the clamp means and in fluid communication with the axial passageway of the clamp means. The establishing means is formed by a cap with the directing means being formed by multiple radially spaced ridges on the surface of the cap. The ridges are interrupted and form concentric arcs so that they define multiple interconnected circumferential and radial channels whereby fluid may flow through the channels to gain access to the second discrete flowpath and thus to the axial passageway of the clamp means.

In still another preferred embodiment, the clamp means may include a hollow bolt having the access providing opening and a threaded sleeve having an axial passageway therethrough. Preferably, one of the bolts and the sleeve is provided with male threads with the other having female threads so that they can be threadingly locked together. The bolt and sleeve are sized to be inserted into one of the discrete flowpaths in the heat exchanger to thereby releasably maintain the establishing means and the filter in sealing assembled relation with the heat exchanger and to provide the fluid a fluid flowpath therethrough. Even more preferably, the sleeve includes one end adapted to be connected to an engine block and an opposite end adapted to be connected to the bolt to thereby provide a fluid flowpath to an engine block.

In another preferred embodiment of the invention, the bolt has a reduced diameter section with the access providing means being formed by an opening on the reduced diameter section thereby facilitating access to the interior of the hollow bolt.

In an exemplary embodiment, a combination of a heat exchanger for exchanging heat between first and second fluids and a filter device for filtering contaminates from the first fluid is provided. A feature of the heat exchanger includes a housing having an inlet and an outlet for the second fluid and a stack of heat exchange units received in the housing with the units each being a pair of plates joined together to define first areas for the flow of the first fluid and to define an axially extending opening through the stack of heat exchange units radially inwardly of the first areas thereof. Means are provided for maintaining the heat exchange units in spaced relation with each other with the maintaining means arranging the heat exchange units in a spaced series to define a multiple second areas for the flow of a second fluid between each pair of the spaced series of heat exchange units so that heat exchange occurs between the fluids through the plates. A feature of the filter device includes a filter having a central opening and defined by a thin disc of filter media. A header plate has a central opening and seals the stack of heat exchange units in the housing and is positioned between the housing and the filter so that the central opening of the header plate is in alignment with the central openings of tile stack of heat exchange units and the filter. An establishing means is provided for establishing fluid communication for the first fluid between the first areas and the central openings after contaminates have been removed from the first fluid with the establishing means having a central opening in alignment with the aligned central openings previously described. A clamp means is provided to maintain the stack of heat exchange units, the filter, the header plate and the establishing means in sealed assembled relation with each other. The clamp means has an opening to provide tile first fluid access to an axial passageway through the clamp means.

Preferably, the pairs of plates are joined together at inner and outer peripheral edges to define the first areas.

Other objects, advantages and features of the present invention will become apparent from a consideration of the following specification taken in conjunction with the accompanying drawings.

DESCRIPTION OF THE PREFERRED EMBODIMENTS

Figure 1:
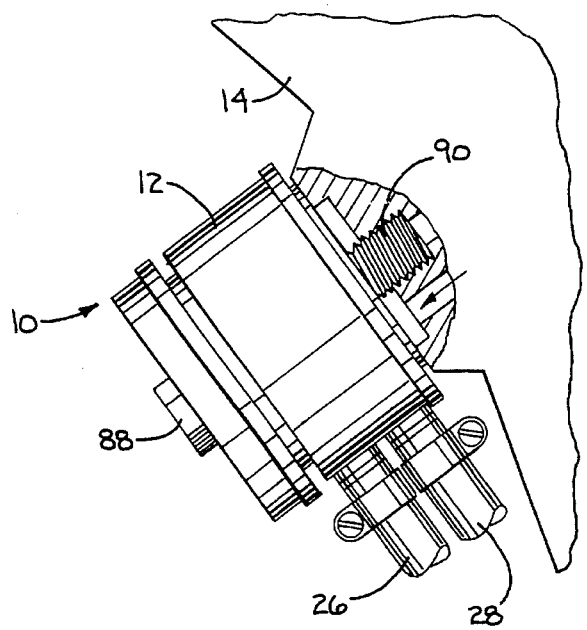
FIG. 1 is an elevational view of a filter assembly for use with a heat exchanger mounted on the block of an engine made according to the invention with parts shown in section.

An exemplary embodiment of a filter device for use with a heat exchanger is illustrated in FIG. 1 in the environment of an internal combustion engine. A filter assembly 10 is mounted on a heat exchanger 12 which in turn is mounted on an engine block 14. The filter assembly 10 serves to filter particulates from a first fluid such as a lubricating oil for the engine. The heat exchanger 12 is a so-called donut oil cooler which may be of conventional construction.

Figure 2:
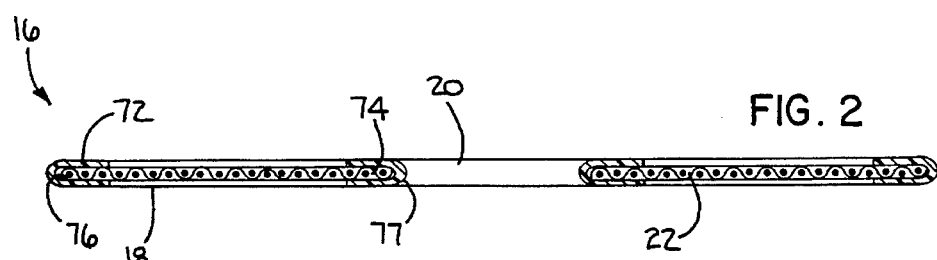
FIG. 2 is an enlarged sectional view showing a filter for use with the filter assembly and heat exchanger.

As shown in FIG. 2, the filter assembly 10 includes a filter 16 having a low volume mass of filter media. Unlike prior spin-on type filters, the filter 16 is more environment friendly because only a low volume mass of filter media is used thereby correspondingly lowering the capacity of the filter 16 for retaining residual oil in the filter 16 after use thereof. Preferably, the filter 16 is formed by a thin disc 18 having a central opening 20 therethrough and which is of sufficient structural integrity, such as stainless steel wire cloth type filters provided by Parker Hannifin Corp., as to be reusable. When necessary, a filter disc 18 of this type can be simply cleaned such as by use of an appropriate solvent and then reinstalled for reuse.

Figure 6:
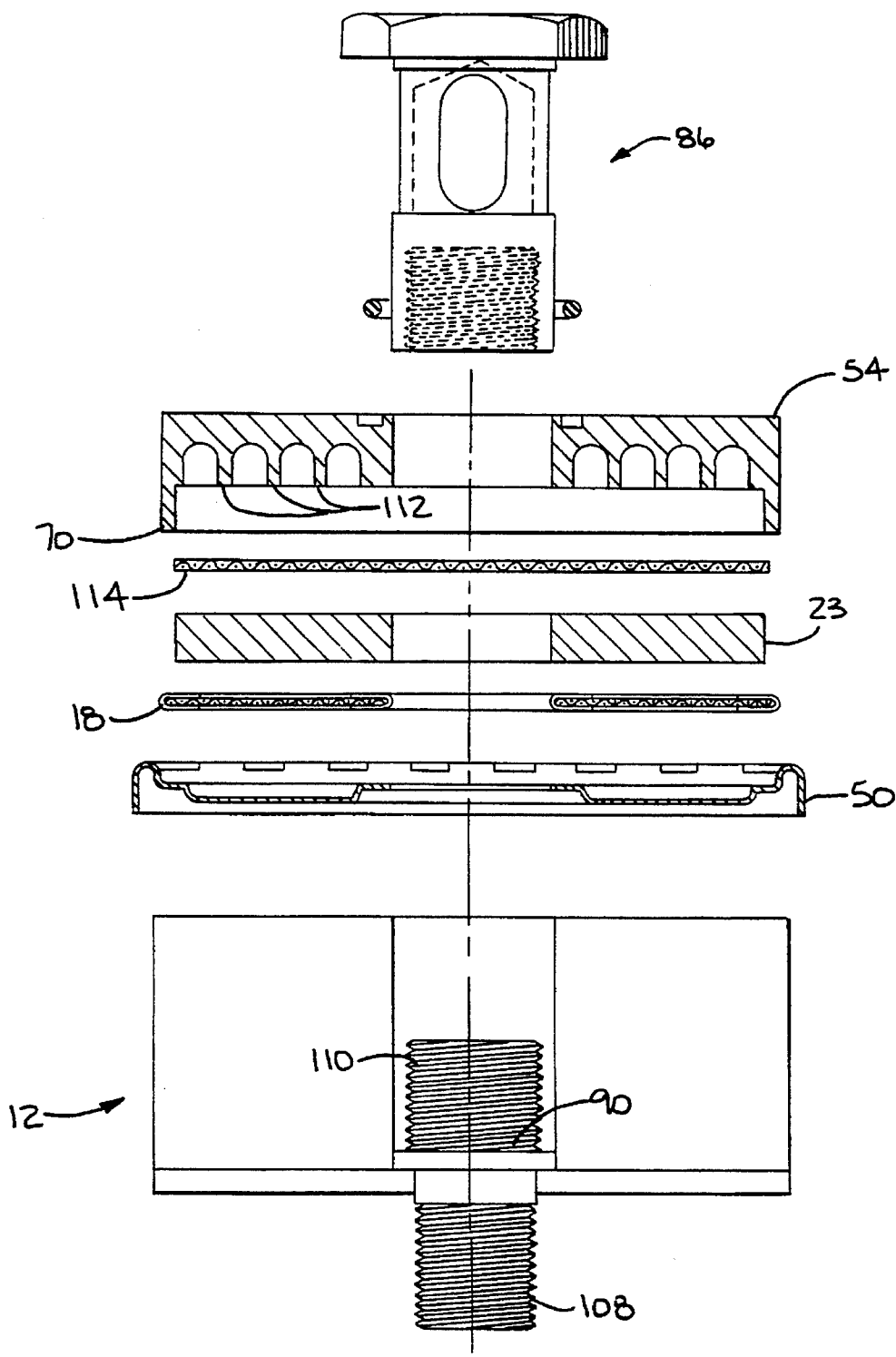
FIG. 6 is an enlarged exploded, sectional view similar to FIG. 2 illustrating a modified embodiment of the invention.

The thin disc 18, by reason of its fabrication from wire cloth, inches fine mesh 22 with small openings therein such that the thin disc 18 can trap harmful solids. The openings may be sized in the range from approximately 28 microns up to about 60 microns. If necessary, several discs 18 can be used. It may be desirable in some cases that at least one thin disc 23 made from a fibrous material, such as a paper or a cellular foam material, be used to trap smaller size particulates, as illustrated in FIG. 6. When a fibrous filter disc 23 is used, other modifications to the filter assembly 10 may be desirable as described herein.

Through normal use of the filter disc 18, the openings can become fouled with particulates. When fouling occurs, the filter disc 18 can simply be removed and cleaned as previously described and then reinstalled in conjunction with the heat exchanger 12 for continued use. In this manner there is no disposal of oil filter cartridges thereby eliminating any concern with regard to residual oil therein. Likewise, if a fibrous filter disc 23 is also used, when it becomes fouled, it can be easily removed and replaced. The fouled fibrous disc 23 may be burned to eliminate landfill disposal concerns.

Figure 4:
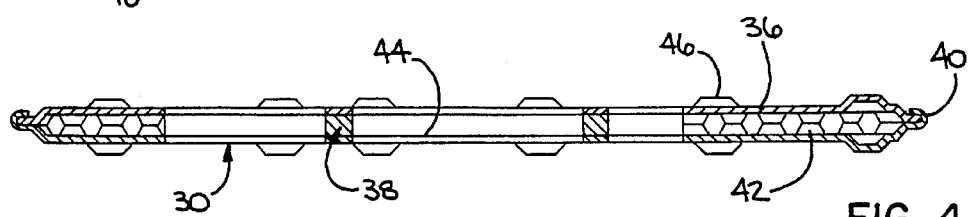
FIG. 4 is an enlarged section view of a heat exchange unit utilized in the heat exchanger.
Figure 3:
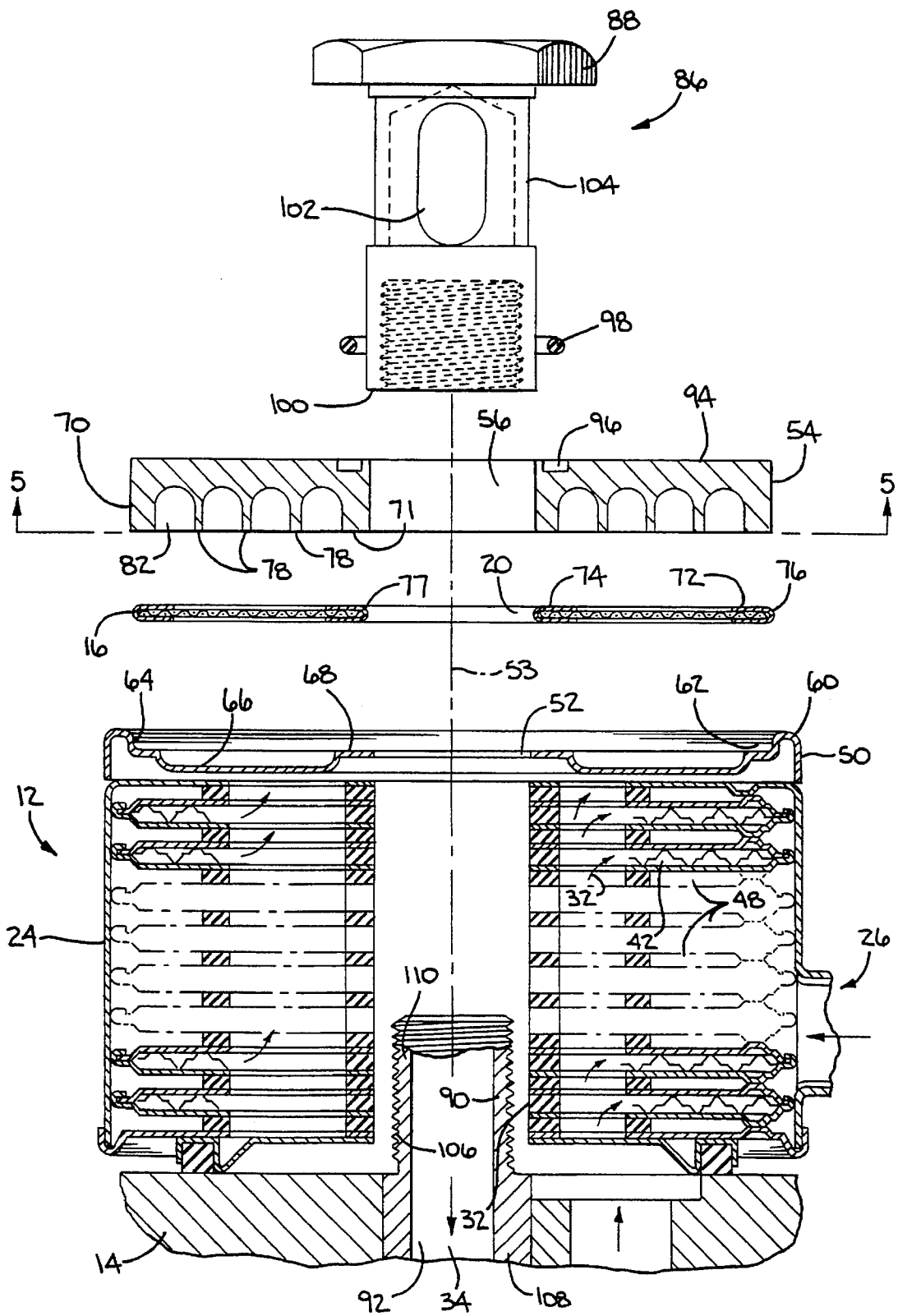
FIG. 3 is an enlarged exploded, sectional view illustrating various details of the filter assembly and the heat exchanger.

FIGS. 3 and 4 illustrate the construction of a typical heat exchanger 12 that can be used in the present invention. As one skilled in the art will appreciate, the exact structure of the heat exchanger may be varied within the spirit of the present invention.

The heat exchanger 12 includes a housing 24 having a coolant inlet 26, a coolant outlet 28 and a stack of list exchange units 30 received in the housing 24. The heat exchanger 12 has first and second discrete flowpaths 32 and 34 for fluid to be filtered as more fully described herein.

The heat exchange units 30 each comprise a pair of nearly identical plates 36 joined together at inner and outer peripheral edges 38 and 40, respectively, to thereby sealingly define a plurality of first areas 42 for the flow of a fluid to be filtered. An axially extending central or elongate opening 44 is formed radially inwardly of the first areas 42.

The heat exchange units 30 are stacked within the housing 24 where they are arranged in a spaced series by maintaining means. The maintaining means can take the form of buttons 46 stamped in the plates which serve to define a plurality of second areas 48 for the flow of a second fluid such as a coolant between each pair of the spaced series of least exchange units 30. The inlet 26 of the housing 24 directs coolant into the second areas 48 and the outlet 28 of the housing 24 receives coolant from the second areas 48. A header plate 50 having a central opening 52 therein seals the stack of heat exchange units 30 in the housing 24 with the header plate 50 being positioned between the filter 16 and the housing 24 so that the header plate central opening 52 is aligned with the central opening 44 of the stack of heat exchange units 30 and the central opening 20 of the thin disc filter 18 along a central axis 53.

The first discrete flowpath 32 of the heat exchanger 12 can be defined by the first areas 42 while the second discrete flowpath 34 of the heat exchanger can be defined by the axially extending central opening 44 formed by the stack of heat exchange units 30. Fluid communication is established between the flowpaths 32 and 34 by establishing means in the form of a cap 54 having a central opening 56, with the cap 54 being sealingly placed over the thin filter disc 18 to sandwich the filter disc 18 against the header plate 50, as illustrated in the exploded view of FIG. 3.

Again referring to FIG. 3, the novel structure for sealing the heat exchanger 12 and the filter device 16 is illustrated. The header plate 50 is provided with a continuous raised outer peripheral annular edge 60 defining an annular groove 62 radially inwardly from the edge 60. The annular groove 62 has a planar bottom surface 64 in which an annular recessed section 66 is formed. The recessed section 66 is provided with openings (not shown) in fluid communication with interiors of the heat exchange unit 30 such that oil which has travelled through the first areas 42 enters the annular groove 62 to gain access to the filter disc 18. Radially inwardly of the recessed section 66 and adjacent the central opening 52, a continuation of the planar bottom surface 64 surrounds the central opening 52.

The cap 54 has an outer peripheral annular edge 70 such that the diameter of the cap edge 70 is approximately the same or slightly smaller than the diameter of the header plate edge 60. It also has an inner peripheral edge 71 that is coplanar with the edge 70 and is of a diameter about equal to that of the opening 52 in the header plate. The thin filter disc 18 has an outer peripheral edge 72 and inner peripheral edge 74 with the inner edge 74 proximate the central opening 20 of the filter disc 18. Along the edges 72 and 74 of the filter disc 18, molded rubber edge gaskets 76 and 77 are provided. The molded elastomeric edge gaskets 76 and 77 sit snugly in the annular groove 62 on the planar bottom surface 64 of the header plate 50 and on the continuation 68 such that when the cap 54 is placed over the filter 16, the inner and outer edges 70 and 71 may compress the edge gaskets 76 and 77, respectively, of the filter disc 18 against the header plate surfaces 64 and 68 to seal the heat exchanger 12 and filter assembly 10.

Figure 5:
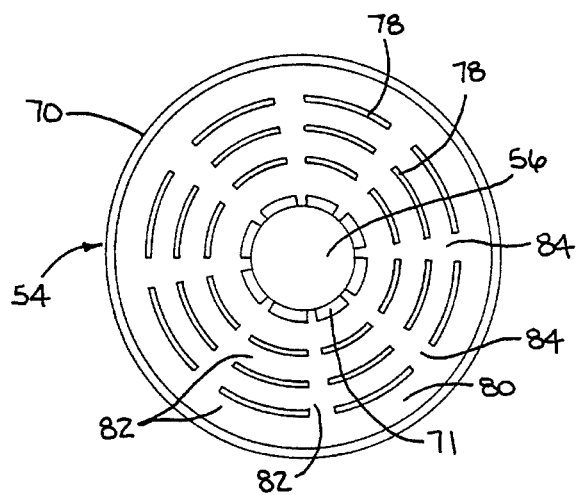
FIG. 5 is a sectional view taken along the line 5—5 in FIG. 3 and showing a cap for use with the filter assembly and heat exchanger.

In operation, the cap 54 receives filtered fluid and directs it towards the axially extending opening 44 by directing means formed by a plurality of radially spaced ridges 78 on a bottom surface 80 of the cap 54. The ridges 78 form concentric arcs so that they define a plurality of interconnected circumferential and radial channels, 82 and 84, respectively, whereby the first fluid can flow through the channels 82 and 84 to gain access to the axially extending opening 44, as best shown in FIG. 5.

Clamp means are provided for maintaining the cap 54 and the filter 16 in sealed assembled relation with the heat exchanger 12 with the clamp means being formed by a hollow bolt 86 having a bolt head 88 and a threaded sleeve 90 having an axial passageway 92 therethrough, as seen in FIG. 3. The sleeve 90 extends from the engine block 14 (FIG. 1) and serves as the oil return. The cap 54 has an upper surface 94 having an annular grove 96 surrounding the cap central opening 56 which receives an O-ring type gasket 98 therein. The hollow bolt 86 is provided with threads 100 on the interior thereof and an access providing means in the form of an opening 102 for providing the filtered fluid access to the interior of the hollow bolt 86. To further facilitate accessibility of the filtered fluid to the interior of the bolt 86, the opening 102 can be provided on a reduced diameter section 104 of the hollow bolt 86. The threaded sleeve 90 has external threads 106, with the threaded sleeve having one end 108 thereof which is adapted to be connected to the engine block 14 and an opposite end 110 thereof which receives the threads 100 of the bolt 86 to connect the bolt 86 and sleeve 90. The bolt 86 and the sleeve 90 are sized to be inserted through the aligned central openings of the header plate 50, the stack of heat exchange units 30, the filter 16, and the cap 54 thereby releasably maintaining the cap 54 and filter 16 in sealed assembled relation with the heat exchanger 14. When the bolt 86 and sleeve 90 are inserted through the central openings and connected to one another, they provide a flowpath for the filtered fluid through the bolt 86 and sleeve 90 and then to the engine. As the bolt 86 is tightened on the sleeve 90, the bolt head 88 compresses the O-ring type gasket 98 into the groove 96 such that the tightening force is transmitted to the cap 54 and then to the filter disc 18 and header plate 50 thus sealing the heat exchanger 12 and filter assembly 10.

When a fibrous filter disc 23 is used in conjunction with a filter disc 18, the cap 54 is modified so that the outer peripheral annular edge 70 is extended, as seen in FIG. 6. The extended annular edge 70 cooperates with crests 112 of the ridges 78 to confine a retaining screen 114. The retaining screen 114 and the filter disc 18 sandwich the fibrous filter 23 so that the flow of oil therethrough does not deform the fibrous filter disc 23. Likewise, the sandwiching of the fibrous filter disc 23 between the retaining screen 114 and the filter disc 18 maintains the structural integrity of the fibrous filter disc 23 so that it does not get torn or punctured as by contact with the header plate 50 or the ridge crests 112.

While in the foregoing, there have been set forth preferred embodiments of the invention, it will be appreciated that the details herein given may be varied by those skilled in the art without departing from the true spirit and scope of the appended claims.

We claim:

1. A filter assembly for use with a heat exchanger to filter contaminates from a fluid flowing therethrough, said filter assembly comprising:

a filter defined by a low volume mass of filter media;

a heat exchanger having first and second discrete flowpaths for a fluid to be filtered, one of said flowpaths adapted to be in heat exchange relation with a coolant;

means for establishing fluid communication between the first and second discrete flowpaths through said heat exchanger for a fluid after contaminates have been removed therefrom, said filter situated between said establishing means and said heat exchanger; and clamp means to maintain said establishing means and said filter in sealed assembled relation with said heat exchanger, said clamp means including means for providing fluid access to an axial passageway therethrough.

2. The filter assembly of claim 1 wherein said filter comprises a thin disc of filter media of sufficient structural integrity as to be reusable.

3. The filter assembly of claim 2 wherein said thin disc includes a central opening such that said thin disc has an inner peripheral edge about said opening and an outer peripheral edge about the circumference of the thin disc with generally circular concentric gaskets being mounted to the disc edges such that the clamp means seals the establishing means against at least the one gasket on the outer peripheral edge of the thin disc.

4. The filter assembly of claim 1 wherein said filter comprises a plurality of thin discs of filter media.

5. The filter assembly of claim 4 wherein said filter media of at least one of said discs comprises a fibrous material.

6. The filter assembly of claim 1 wherein said filter media comprises a thin screen element of fine mesh for the passage of a fluid therethrough.

7. The filter assembly of claim 6 wherein the fluid flows through the first discrete flowpath and said fine mesh conduits and then said second discrete flowpath in series so that contaminates in the fluid are trapped by the screen element as said fluid passes through said fine mesh before entering said second discrete flowpath.

8. The filter assembly of claim 7 wherein the second discrete flowpath is defined by an elongate opening receiving said clamp means therethrough, and said establishing means includes means for directing the fluid toward the second discrete flowpath.

9. The filter assembly of claim 8 wherein the access providing means is an opening in said clamp means in fluid communication with said axial passageway of said clamp means.

10. The filter assembly of claim 9 wherein said establishing means comprises a cap and said directing means comprises a plurality of radially spaced ridges on a surface of said cap, said ridges forming concentric arcs so that said ridges define a plurality of interconnected circumferential and radial channels whereby said fluid can flow through said radial channels to gain access to the second discrete flowpath and thereby to said axial passageway of said clamp means.

11. The filter assembly of claim 1 wherein said clamp means includes a hollow bolt having said access providing means and a threaded sleeve having an axial passageway therethrough.

12. The filter assembly of claim 11 wherein one of said bolt and said sleeve is provided with internal threads and the other of said bolt and said sleeve is provided with external threads so that said bolt and said sleeve can be threadingly locked together, said sleeve and said bolt being sized to be inserted into one of said discrete flowpaths in the heat exchanger to thereby releasably maintain said establishing means and said filter in sealed assembled relation with the heat exchanger and to provide the fluid a fluid flowpath therethrough.

13. The filter assembly of claim 12 wherein said sleeve includes one end adapted to be connected to an engine block and an opposite end adapted to be connected to said bolt to thereby provide a fluid flowpath to an engine block.

14. The filter assembly of claim 11 wherein said bolt includes a reduced diameter section and said access providing means is an opening on said reduced diameter section to facilitate access to the interior of said hollow bolt.

15. In combination, a heat exchanger for exchanging heat between first and second fluids and a filter device for filtering contaminates from the first fluid, said combination comprising:

a housing including an inlet and an outlet for said second fluid;

a stack of heat exchange units received within said housing each comprising a pair of plates joined together to define a plurality of first areas for the flow of said first fluid and to define an axially extending central opening through said stack of heat exchange units radially inwardly of said first areas thereof, and means for maintaining said heat exchange units in spaced relation, said means arranging said heat exchange units in a spaced series to define a plurality of second areas for the flow of said second fluid between each pair of said spaced series of heat exchange units so that heat exchange between said fluids occurs through said plates;

at least one filter having a central opening and defined by a thin disc of filter media;

a header plate having a central opening, said header plate sealing said stack of heat exchange units within said housing and being positioned between said stack and said filter so that said header plate central opening is aligned with said central openings of said stack of heat exchange units and said filter;

means for establishing fluid communication between said first areas and said central openings for said first fluid after contaminates have been removed therefrom, said establishing means having a central opening in alignment with said aligned central openings of said heat exchange units, said filter and said header plate; and clamp means to maintain said stack of heat exchange units, said filter, said header plate and said establishing means in sealed assembled relation with each other, said clamp means having an opening to provide said first fluid access to an axial passageway therethrough.

16. The combination of claim 15 wherein said filter comprises a thin disc of filter media of sufficient structural integrity as to be reusable.

17. The combination of claim 15 wherein said filter media of at least one of said discs comprises a fibrous material.

18. The combination of claim 15 wherein said first fluid flows through said first areas and said filter in series so that contaminates in said first fluid are trapped by said screen element as said first fluid passes through said fine mesh conduits.

19. The combination of claim 15 wherein said pair of plates are joined together at inner and outer peripheral edges to define said plurality of first areas.

20. The combination of claim 15 wherein said establishing means comprises a cap with said cap being placed over said filter to sandwich the filter against said header plate.

21. The combination of claim 15 wherein said establishing means includes means for directing said first fluid toward said axially extending opening after contaminates have been removed therefrom.

22. The combination of claim 21 wherein said establishing means comprises a cap and said directing means comprises a plurality of radially spaced ridges on a surface of said cap, said ridges forming concentric arcs so that said ridges define a plurality of interconnected circumferential and radial channels whereby said first fluid can flow through said radial channels to gain access to said axially extending opening.

23. The combination of claim 15 wherein said clamp means includes a hollow bolt having said opening and a threaded sleeve having an axial passageway therethrough.

24. The combination of claim 23 wherein one of said bolt and said sleeve is provided with internal threads and the other of said bolt and said sleeve is provided with external threads so that said bolt and said sleeve can be threadingly locked together, said sleeve and said bolt being sized to be inserted through said aligned central openings of said header plate, said stack of heat exchange units, said filter, and said establishing means to thereby releasably maintain said header plate, said stack of heat exchange units, said filter, and said establishing means in sealed assembled relation with each other and to provide said first fluid flowpath therethrough.

* * * * *